(12) United States Patent
Klotz et al.

(10) Patent No.: US 7,060,245 B1
(45) Date of Patent: Jun. 13, 2006

(54) PROCESS AND APPARATUS FOR THE CONTINUOUS REFINING OF LITHARGE

(75) Inventors: Hanns G. Klotz, Highland, IN (US); William Peter Wilke, IV, Munster, IN (US)

(73) Assignee: Hammond Group, Inc., Hammond, IN (US)

( * ) Notice: Subject to any disclaimer, the term of this patent is extended or adjusted under 35 U.S.C. 154(b) by 581 days.

(21) Appl. No.: 09/718,369

(22) Filed: Nov. 24, 2000

(51) Int. Cl.
*C01G 21/02* (2006.01)

(52) U.S. Cl. .................................. 423/619; 423/620

(58) Field of Classification Search ............... 423/619, 423/620
See application file for complete search history.

(56) References Cited

U.S. PATENT DOCUMENTS

| 592,594 A | 10/1897 | Petracus |
| 633,533 A | 9/1899 | Pope et al. |
| 975,955 A | 11/1910 | Hughes |
| 988,963 A | 4/1911 | Barton |
| 1,060,153 A | 4/1913 | Barton |
| 1,511,215 A | 10/1924 | Calbeck |
| 2,065,218 A | 12/1936 | Garesche |
| 2,235,487 A | 3/1941 | Mayer |
| 3,322,496 A | 5/1967 | Vahrenkamp et al. |
| 3,648,936 A | 3/1972 | Stephanoff |
| 4,419,466 A | 12/1983 | Hopkins |
| 5,763,678 A | 6/1998 | Beckers et al. |
| 6,017,460 A | 1/2000 | Eller et al. |

FOREIGN PATENT DOCUMENTS

| DE | 19544603 | 6/1997 |
| EP | 0216568 | 4/1987 |
| WO | WO9510482 | 4/1995 |

OTHER PUBLICATIONS

"Leads Oxides-Chemistry Technology-Battery manufacturing Uses-History" Independent Battery Manufacturers Association, Inc., pp. 21-25 (1974), no month.

*Primary Examiner*—Steven Bos

(57) ABSTRACT

The invention relates generally to the manufacture of orthorhombic litharge (yellow lead oxide) and in particular to a process for the continuous refining of litharge and a loopreactor for the refining of litharge.

13 Claims, 1 Drawing Sheet

PROCESS AND APPARATUS FOR THE CONTINUOUS REFINING OF LITHARGE

BACKGROUND OF THE INVENTION

The invention relates generally to the manufacture of ortho-rhombic litharge (yellow lead oxide) and in particular to a process for the continuous refining of litharge and a loopreactor for the refining of litharge.

Litharge is an important article of commerce, used on a large scale in a number of industrial manufacturing processes. High purity litharge, for example containing less than 0.01% metallic lead, is typically required.

Litharge of sufficiently high purity for use in the glass industry has been manufactured by the Barton pot process for many years. In this process, lead is molten and fed to the Barton pot where it is agitated and contacted with air at a temperature up to 600° C. In the Barton pot, the pool of molten lead is stirred by high speed blades. This throws up droplets which are oxidized by the air, but the oxidation is incomplete. The solid powder product, containing from about 70 to 99% PbO, is entrained in the air stream while the heavier lead doplets fall back into the pool.

The Barton pot process is limited by the requirement for multiple steps, involving an expensive train of equipment, and also by the fact that the maximum size of a Barton pot is limited, which frequently creates the need for a number of Barton pots to achieve a desired production level. The Barton pot process and other prior art processes are described in "LEAD OXIDES—Chemistry—Technology—Battery Manufacturing Uses—History" (1974), Independent Battery Manufactures Association, Inc., Florida USA, at pages 21 to 25. Reference is made to Barton's U.S. Pat. Nos. 988,963 (1911) and 1,060,153 (1913), Pope and Barton U.S. Pat. No. 633,533 (1899), Mayer 2,235,487 (1941), and Vehernkamp et al. 3,322,496 (1967).

In describing a "fused litharge furnace" with reference to Hughes U.S. Pat. No. 975,955 (1910) and Petraeus U.S. Pat. No. 592,594 (1897), which is said to be "now mainly of historical interest" this book comments that "A mixed bath of lead and litharge at about 1000° C. has almost fantastic corrosive and erosive properties" which has caused major problems.

The book also describes the "fume type process", which produced a "smoke" from which a product of fine particle size was recovered in a baghouse. (Calbeck U.S. Pat. No. 1,511,215 (1924) and Garesche U.S. Pat. No. 2,065,218 (1936)).

U.S. Pat. No. 3,648,936 relates to a constant acceleration fluid energy mill. Said fluid energy mill is comprising a lower inlet section and an upper classification section connected by a vertical upstack on one side and a vertical downstack on the other side, the inlet section having tangential nozzles connected to a source of gaseous fluid pressure and a raw feed inlet, whereby the raw feed particles are entrained and centrifugally whirled around the mill by the pressure fluid. The portion of the inlet chamber adjacent the upstack, as well as the upstack itself and the portion of the classification chamber adjacent the upstack form part of an antifriction curve. The classification section is preferably generally circular and has at least one exhaust outlet in the center so that the lighter particles on the inner periphery of the centrifugal path are rotated in a helical path until exhausted through the outlet. Preferably, nozzles are provided in the classification section to project pressure fluid thereinto in a generally elliptical path.

However, in view of the high density of litharge the direct adaption of said fluid energy mill for the refining of litharge is impossible. One of the important problems in the technology of refining litharge is the dosage of litharge to provide a constant flow in a continuous reactor.

SUMMARY OF THE INVENTION

The primary object of the present invention is to provide a process for the refining of litharge.

Another object of the invention is to provide a loopreactor.

Other objects and advantages of the present invention will become apparent from the following description, taken in connection with the accompanying drawing, wherein, by way of illustration and example, an embodiment of the present invention is disclosed.

In a first embodiment the invention relates to a process for the continuous refining of ortho-rhombic litharge (yellow lead oxide) hereinafter defined as litharge, having a starting content of free metallic lead of about 1 to about 30% by weight to litharge having a residual reduced content of free metallic lead of less than 10% by weight, preferably less than about 1% by weight in a reaction section 4 of a loopreactor 1, by introducing a fluidized mixture of said lead containing lead oxide and a gaseous fluid into said reaction section 4 of said loopreactor 1 via an inlet section 2, further introducing said first gaseous fluid into said reaction section 4 via a by-pass section 3, said by-pass section 3 being located in the reaction section 4 of said loopreactor 1 downstream to said inlet section 2, mixing said fluidized mixture of the inlet section 2 with the gaseous fluid of the by-pass section 3 in said reaction section 4 by propelling the resultant mixture in a direction which is essentially tangential to the initial direction of said first fluidized mixture, thereby reacting the particles of lead containing lead oxide with said gaseous fluid, passing said resultant, still reacting mixture through a curved path 4a, 4b in said reaction section 4, the curved path 4a, 4b being defined by a tractrix antifriction curvature (see U.S. Pat. No. 3,648,936, incorporated herein by reference) through a classification section 5 which is defined partially by a continuation of said tractrix curvature, said resultant still reacting mixture being divided into heavier particles containing a partially reduced, higher content of non-reacted metallic lead and lighter particles containing a partially reduced lower content of non-reacted metallic lead within said classification section 5, adjusting the number of reaction cycles by adjusting the particle velocity, reaction time and reaction temperature within said reaction section 4 to provide the desired reduced residual content of metallic lead of said lead oxide when passing the outlet section 6, separating said lighter particles from the classification section 5 via said outlet section 6 by introducing a second gaseous fluid via an injection section 7 into said reaction section 4 at a location downstream to said outlet section 6 to reaccelerate the particle velocity and to interfere with said introduced mixture of feedstock material and first gaseous fluid being provided to said reaction section 4 by the inlet section 2 and said gaseous fluid introduced by the by-pass section 3.

The core of the invention is to be seen in particular in that a fluidized mixture of lead containing lead oxide is conveyed in a loopreactor 1 by oxidizing the free metallic lead to a desired reacted amount. The litharge having the desired residual content of free metallic lead and a brilliant and yellow color is passed through a reaction section 4, a classification section 5 to an outlet section 6.

A further embodiment of the present invention relates to a loopreactor 1 comprising a reaction section 4 being generally circular, at least one inlet section 2 for essentially tangentially inserting a mixture of feedstock material and a gaseous fluid into said reaction section 4, at least one by-pass section 3 for inserting gaseous fluid into said reaction section 4, said by-pass section 3 being located downstream to said inlet section 2 in the reaction section 4, a classification section 5 provided downstream to said inlet section 2 and said by-pass section 3, at least one outlet section 6, being part of said classification section 5, provided at the inner periphery of said reaction section 4 for removing particles from the centrifugal path 4a,4b of feedstock material being propelled through said loopreactor 1 and at least one injection section 7 for introducing a second gaseous fluid into the reaction section 4 provided downstream to said outlet section 6.

DETAILED DESCRIPTION OF THE PREFERRED EMBODIMENTS

Figure 1:
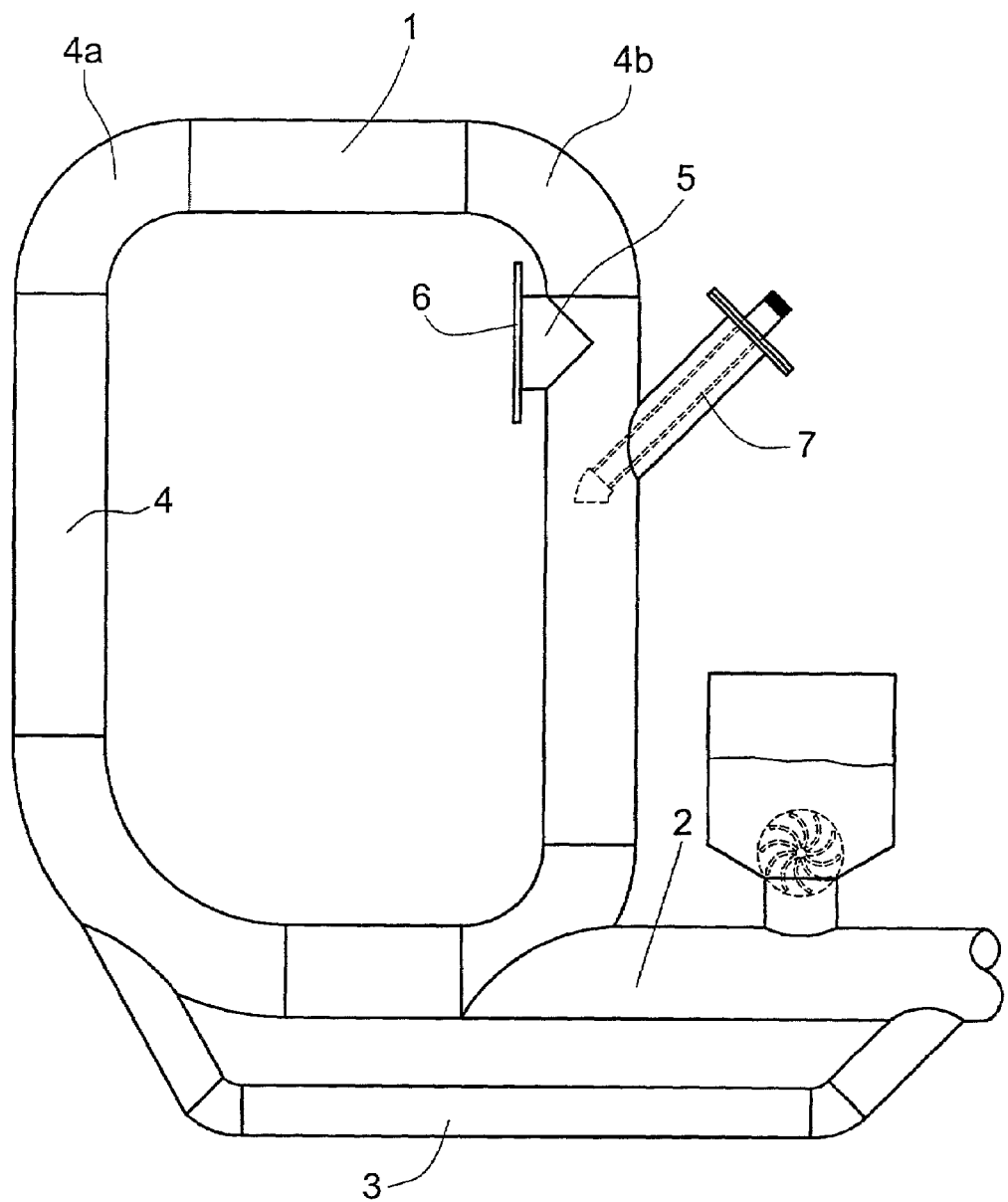
FIG. 1 is a schematic representation of the basic elements of the loopreactor 1 according to the present invention.

As referred to above a serious problem in the technology of refining of litharge is to provide a constant flow of the high density material in a reactor. This problem is overcome by the present invention in particular by introducing a first fluidized mixture of lead containing lead oxide (litharge) and a first gaseous fluid into a reaction section via an inlet section 2. In order to avoid plugging in the reaction system a further stream of said first gaseous fluid is introduced into said reaction section 4 via by-pass section 3, wherein said by-pass section is located downstream to said first inlet system 2. In particular, it is preferred to introduce said first gaseous fluid transversely to the stream of the first mixture. Thus, by introducing said first gaseous fluid essentially radially inwardly or tangential to the center of the loopreactor 1 said first mixture of feedstock material and gaseous fluid is brought into a centrifugal path 4a, 4b of feedstock material. Accordingly, a constant flow of said high density material litharge is possible.

By said by-pass section 3 a partial stream of said first gaseous fluid is introduced into said stream of feedstock material and first gaseous fluid of a generally circular loopreactor at elevated temperature. By introducing said gaseous fluid the resultant mixture is moved in the reactor in a direction which is essentially tangential to the initial direction of the first introduced fluidized mixture. Due to this centrifugal acceleration of the litharge material lower weight particles and higher weight particles can be divided in a classification section 5.

The mixture of introduced feedstock material and first gaseous fluid preferably should have an inlet temperature of a about 630 to about 670° C. In the same way, within the reaction section 4, in particular before entering the classification section 5 the temperature in the loopreactor 1 should be kept at that temperature selected in the range of 600 to about 630° C. Accordingly, the remaining metallic lead will be practically quantitatively oxidized to the desired litharge product having a low content free metallic lead and a bright yellow color. The present invention even allows the preparation of litharge having a residual content of free metallic lead in the region of ppm. Thus, by passing the loopreactor 1 for several times the content can be reduced to traces of free metallic lead only.

The classification section 5 and the classification process in particular can be described by a curved path 4a, 4b in the reaction section 4, the curved path 4a, 4b being defined by a tractrix antifriction curvature dividing the reacted particles into heavier particles containing a partially reduced, higher content of non-reacted metallic lead and lighter particles containing a partially reduced lower content of non-reacted metallic lead within said classification section 5. Higher content of non-reacted metallic lead in a sense of the present invention has the meaning, that relative to the starting content of metallic lead, the content thereof has not been exceptionally reduced.

In order to optimize the refining process according to the present invention, the process is adjusted in a way that the lead containing litharge particles have to undergo the circular process one or several times until the desired content of lead is obtained. Once a continuous reaction has started up, the reaction may be monitored by sampling at a location close to the outlet section 6.

A further important feature of the process and loop reactor 1 of the present invention is the injection of a second gaseous fluid via a injection section 7 into the loopreactor 1 at a location downstream to the outlet section 6 to reaccelerate the particle velocity to interfere with said introduced first mixture of feedstock material and first gaseous fluid being provided to the reactor 1 by the inlet section 2 and the by-pass section 3. This injection section 7 practically acts as a kind of pump like a water-jet pump and further divides heavier from finer particles. Thus, in a typical embodiment, air is introduced with high pressure of for example about 80 psi ($55 \times 10^6$ Pa) to about 90 psi ($62 \times 10^6$ Pa) as the second gaseous fluid. Accordingly, when introducing the feedstock material and gaseous fluid via the inlet section 2 and the first gaseous fluid provided to the reactor 1 by the by-pass section 3 with a velocity of 5000 to 20000 ft/min a continuous oxidizing reaction can be maintained. The temperature of said second gaseous fluid introduced preferably should be within the range of about 630° C. to about 670° C.

In a preferred embodiment, the weight ratio of the feedstock material to first gaseous fluid introduced to the reaction section by the inlet section 2 is selected in the range of about 1:about 1 to about 1:about 3.

For cost reasons said first gaseous fluid preferably is an oxygen containing gas. Most preferably said first gaseous fluid is air, which is preheated to the desired temperature in order to allow the injection of litharge at a temperature in the range of about 630 to about 670° C. The volume ratio of said first gaseous fluid provided by the inlet section 2 relative to the volume of the first gaseous fluid introduced by the by-pass section 3 is of some importance. Preferably, said volume ratio is adjusted to be selected by the diameters of the tubes defining the inlet section 2 and the by-pass section 3 in the range of about 10:1 to about 3:about 1.

Furthermore, the volume ratio of the combined volume of said mixture of feedstock material and first gaseous fluid provided by the inlet section 2 and first gaseous fluid introduced by the by-pass section 3 relative to the volume of the second gaseous fluid introduced by the injection section 7 is of some importance. Preferably, said volume ratio is selected in the range of about 100:about 0.1 to about 100:about 10.

More preferably said volume ratio is selected in a range of about 100 to about 2.

Finally, the remaining reaction time of feedstock material in the reactor 1 is adjusted in the range of about 1 to about 5 seconds. If the reaction time is adjusted as being too short, the desired reduction in content of free metallic lead will not be achieved. In case the reaction time is adjusted as being to long, the disadvantage is a worse than optimum production rate.

In order to allow a constant flow of the reaction throughout the time, the overall weight load of the reactor is adjusted to from about 25 to about 50% by weight based on the solid particles of feedstock material. Thus, based on the heavy, high density litharge, a high dense particle stream is reacted.

After leaving the reaction section 4 of the loopreactor 1 via the outlet section 6, the litharge product has to be cooled down quickly to ambient temperature in order to avoid a further reaction to minium (red lead oxide) at a temperature of about 450° C.

Although this apparatus of the present invention has been described primarily for the refining of litharge, it may also be used for such other purposes as drying, chemical reactions, coating, agglomerating or deagglomerating, and many other functions, depending on the type of gaseous fluids used, the feedstock material fed into the reactor, the velocities and pressures of the gaseous fluid as they pass into the reactor, the angles of incidence of the nozzles relative to interior of the reactor, etc. It is to be further noted that although the reactor 1 is illustrated as being vertical, this being the preferred position, it may also be utilized in the horizontal or any other desired position.

The inner surface of the reactor preferably is constructed of a material which can withstand the litharge material. In order to prevent corrosion by litharge (although it is not in liquid state in the present reactor 1), the interior hot surface of the loopreactor 1 is kept below the melting point of the litharge (888° C.).

The residual content of metallic lead in litharge obtained by the present invention can be determined by dissolving the litharge product at room temperature in an aqueous solution of acetic acid. An appropriate high quality of litharge is produced if the product litharge is completely dissolved without residue, providing an optically clear solution, within some seconds.

What is claimed is:

1. A process for the continuous refining of litharge having a starting content of metallic lead of about 1 to about 30% by weight to litharge having a residual reduced content of metallic lead of less than about 10% by weight in a reaction section of a loopreactor, comprising steps of:

introducing a first fluid stream, the first fluid stream comprising a solid feedstock material and a first gaseous fluid, into said reaction section of said loopreactor via an inlet section, wherein said solid feedstock material comprises lead oxide and metallic lead, introducing a second fluid stream comprising said first gaseous fluid into said reaction section via a by-pass section, said by-pass section being located in the reaction section of said loopreactor downstream to said inlet section, mixing said first fluid stream with said second fluid stream in said reaction section by propelling the first fluid stream and second fluid stream to form a resultant, still-reacting mixture in a direction which is essentially tangential to the initial direction of said first fluid stream, thereby reacting at least a portion of the solid feedstock material with said first gaseous fluid, passing said resultant, still-reacting mixture through a curved path in said reaction section, the curved path being defined by a tractrix antifriction curvature through a classification section which is defined partially by a continuation of said tractrix curvature, said resultant, still-reacting mixture being divided into heavier particles containing a partially reduced, higher content of non-reacted metallic lead and lighter particles containing a partially reduced lower content of non-reacted metallic lead with said classification section, adjusting the number of reaction cycles by adjusting the particle velocity, reaction time and reaction temperature within said reaction section to provide the desired reduced residual content of metallic lead of said lead oxide when passing an outlet section, separating said lighter particles from the classification section via said outlet section by introducing a second gaseous fluid via an injection section into said reaction section at a location downstream to said outlet section to reaccelerate the particle velocity and to interfere with said first fluid stream, said resultant still-reacting mixture and said second fluid stream.

2. The process according to claim 1, wherein said solid feedstock material is introduced into the loopreactor via the inlet section having a starting content of metallic lead exceeding about 10% by weight.

3. The process according to claim 1, wherein the weight ratio of the solid feedstock material to the second fluid stream is selected in the range of about 1:about 1 to about 1:about 3.

4. The process according to claim 1, wherein said first gaseous fluid is an oxygen containing gas.

5. The process according to claim 1, wherein said first gaseous fluid is air.

6. The process according to claim 1, wherein the first fluid stream and the second fluid stream are introduced into the reaction section at a temperature selected in the range of about 630 to about 670° C.

7. The process according to claim 1, wherein the first fluid stream and the second fluid stream are introduced into the reaction section having a velocity selected in the range of about 5,000 ft/min to about 20,000 ft/min.

8. The process according to claim 1, wherein volume ratio of the first fluid stream relative to the second fluid stream is selected in the range of about 10:about 1 to about 3:about 1.

9. The process according to claim 1, wherein the reaction temperature in the reaction section is adjusted in the temperature range of about 600 to about 670° C.

10. The process according to claim 1, wherein the volume ratio of the combined volume of the first fluid stream and the second fluid stream relative to the volume of the second gaseous fluid injected by the injection section is selected in the range of about 100:about 0.1 to about 100:about 10.

11. The process according to claim 1, wherein said second gaseous fluid is air at ambient temperature, introduced with a velocity selected in the range of about 5,000 ft/min to about 6,000 ft/min.

12. The process according to claim 1, wherein the reaction time of the solid feedstock material within the loopreactor is adjusted in the range of about 1 to about 5 sec.

13. The process according to claim 1, wherein the overall volume load of the loopreactor is adjusted to about 25 to about 50% by volume, based on the solid feedstock material.

* * * * *